US007707561B2

(12) United States Patent
Vera

(10) Patent No.: US 7,707,561 B2
(45) Date of Patent: Apr. 27, 2010

(54) APPARATUS, SYSTEM, AND METHOD FOR CONVERTING DATA

(75) Inventor: Pedro Sanchez Vera, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 712 days.

(21) Appl. No.: 11/058,011

(22) Filed: Feb. 15, 2005

(65) Prior Publication Data

US 2006/0184922 A1  Aug. 17, 2006

(51) Int. Cl.
*G06F 9/45* (2006.01)
(52) U.S. Cl. .................. 717/136; 717/140; 717/143
(58) Field of Classification Search ................. 717/136, 717/140, 143; 715/513
See application file for complete search history.

(56) References Cited

U.S. PATENT DOCUMENTS

| 5,230,049 | A | * | 7/1993 | Chang et al. ................. 717/143 |
| 5,581,762 | A | | 12/1996 | Hayashi et al. |
| 5,745,908 | A | * | 4/1998 | Anderson et al. ............ 715/513 |
| 6,202,201 | B1 | * | 3/2001 | Domi .......................... 717/136 |
| 6,378,126 | B2 | * | 4/2002 | Tang .......................... 717/143 |
| 6,400,287 | B1 | | 6/2002 | Ehrman |
| 2002/0120601 | A1 | * | 8/2002 | Elmendorf et al. ............. 707/1 |
| 2003/0065976 | A1 | | 4/2003 | Bennett et al. |
| 2005/0172276 | A1 | * | 8/2005 | Eilebrecht .................... 717/143 |

FOREIGN PATENT DOCUMENTS

EP  1376348 A2  6/2003

OTHER PUBLICATIONS

Otto, T. P. "An APL Compiler", 2001, ACM, p. 186-193.*

* cited by examiner

*Primary Examiner*—Wei Y Zhen
*Assistant Examiner*—Qamrun Nahar
(74) *Attorney, Agent, or Firm*—Kunzler Needham Massey & Thorpe

(57) ABSTRACT

An apparatus, system, and method are disclosed for converting data into source code such that the data can be translated and become part of a load module suitable for accessing from a load library. The apparatus includes a parser module, a format module, and an output module. The parsing module analyzes a data file having one or more data lines. The format module automatically formats the data file so that it can be translated by a translator. The formatted data file includes one or more computer language instructions containing the appropriate syntax corresponding to the particular translator. The output module outputs the formatted data file as an output file that can be renamed to preserve the original data file. A verification module allows the formatting of the data file to be verified.

28 Claims, 6 Drawing Sheets

APPARATUS, SYSTEM, AND METHOD FOR CONVERTING DATA

BACKGROUND OF THE INVENTION

This invention relates to an apparatus, system, and method for converting data and more particularly, relates to an apparatus, system, and method for automatically converting non-source code data files into computer instructions that can be assembled and packaged in a load module.

DESCRIPTION OF THE RELATED ART

The objective of most computer system innovation is to increase the speed and efficiency of the computer system. Some advances that improve performance are not immediately implemented. One reason for this is that it may not be cost effective to implement new innovations at the time they are discovered. Implementation of some innovations requires a complete redesign of system architecture. Thus, although a single computer may run faster with an innovative design, changing the design of many computers on a system may be cost prohibitive. Another reason why some innovations are not immediately implemented is that the innovation would require new standards or conventions not recognized by existing systems.

Many existing or "legacy" systems have proven architectures, standards, and/or conventions that function adequately and reliably. Small advances in performance speed are often not worth major overhauls to these existing systems. This is especially true when industry standards have been developed based upon those systems or conventions. These standards or conventions cover a wide variety of areas, including system searches. For example, the use of load libraries has been to facilitate locating and loading of executable code. In some operating systems, such as the z/OS® operating system used by certain International Business Machine (IBM) computers, the operating system, user, or user program can employ a "load" command to quickly access a file from a load library, without needing to know the entire location name (i.e., path) of the file in which the desired data resides. Without having to know the directory name or partition data set name makes searching load libraries quicker.

By convention, data available for a load library search needs to be in the form of an executable load module. The process of creating a load module may involve compiling a data file from a high-level computer language or assembling the data file from assembly language. The resulting file may have machine language in it, but it may not be an executable file yet. The resulting compiled or assemble file is then put through a link edit process to package or link desired additional files or libraries. The end result is an executable load module. These load modules can be used to build libraries for new systems or to update the libraries or directories of existing systems.

Not only do small advances in speed and performance occur on a regular basis, but entirely new methods of communication and data information distribution are developed over time. As new technology arrives, different types of hardware, software, and data are born. Where possible, it is usually more cost effective to try to integrate these new types of structures and data into existing systems.

One relatively recent new form of information distribution is the Internet. With that development has come new types of data and data conventions. One type of new data standard or convention, for example, is Extensible Markup Language, or XML. XML is designed to improve the functionality of the Internet by providing more flexible and adaptable information identification. As data conventions such as XML become standardized, existing systems must learn how to deal with them. One problem, however, is that new data types do not lend themselves readily to existing search and code loading techniques such as load library searches. For example, users of certain legacy systems may require access to XML data. This data, however, is not in a form where it can be accessed by a load library search.

From the foregoing discussion, it should be apparent that a need exists for an apparatus, system, and method that can convert data such that it can readily be implemented into a load module for convenient and fast load library searching. It would be an advancement in the art for such an apparatus, system, and method to allow conversion of a data file without overwriting the original data file. It would be a further advancement in the art to provide such an apparatus, system, and method that would allow verification of the converted data by a user or system. Such an apparatus, system, and method are disclosed and claimed herein.

SUMMARY OF THE INVENTION

The present invention has been developed in response to the present state of the art, and in particular, in response to the problems and needs in the art that have not yet been fully solved by currently available data converters. Accordingly, the present invention has been developed to provide an apparatus, system, and method for converting data that overcomes many or all of the above-discussed shortcomings in the art.

The apparatus to convert data is provided with a logic unit containing a plurality of modules configured to functionally execute the necessary steps of reading data converting the data, and outputting the data into a file that could be compiled, assembled, or otherwise translated. The converted format then can be translated and packaged into a load module or other executable file that facilitates searching for the desired data. These modules in the described embodiments may include a parser module, a format module, and an output module.

The apparatus, in one embodiment, is configured to analyze a data file having one or more data lines and automatically format the data file such that the formatted data file can be translated by a translator. In one embodiment, the formatted data file includes one or more computer language instructions. The output module may output the formatted data file as an output file for later translation and inclusion into a load module or an executable file.

The format module may add tokens or symbols or other indicators that are recognized by the particular translator being used in order to facilitate the later translation of the data file into a load module. In one embodiment, the format module may also delete symbols or spaces to convert the data file into one or more computer language instructions recognizable by the particular translator being used.

The apparatus may further be configured, to include a verification module to allow verification of the formatting of the data file. In one embodiment, the apparatus may include a naming module configured to create a name for the output file. The output file may have a different name than the original file to preserve the original data file. The apparatus may also include a package module for packaging the converted data file into a load module or other executable file.

A system of the present invention is also presented for converting data. The system may include the modules of the apparatus described above. In addition, the system, in one embodiment, includes a processor, a translator, a package module, Input/Output (I/O) devices, a communication bus, a storage device, and a memory. The memory may include the parser module, the format module, and the output module. The memory may also include a verification module, a naming module and a package module. The processor executes software to mange operations of the system. The storage device may store one or more data files. The I/O devices interact with a user. The communication bus operatively couples the processor, translator, I/O devices, storage device and memory.

In one embodiment, the system converts a data file, not entirely made up of source code, such that a translator such as an assembler or compiler can translate the data file. The system may utilize the format module to modify the data file such that it includes the proper syntax required by a particular translator to translate the converted data file into an executable file. The system may also translate the converted data file and package it as a load module.

A method of the present invention is also presented for converting data. The method in the disclosed embodiments substantially includes the steps necessary to carry out the functions presented above with respect to the operation of the described apparatus and system. In one embodiment, the method is embodied in a signal bearing medium tangibly embodying a program of machine-readable instructions executable by a digital processing apparatus to perform an operation to convert data. The operation may include the steps of parsing a data file having one or more data lines, formatting the data file such that the formatted data file can be translated by a translator, and outputting the formatted data file as an output file. In one embodiment, the formatted data file includes one or more computer language instructions. The signal bearing medium may also include an operation to verify that the formatted data file can be translated by the translator.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
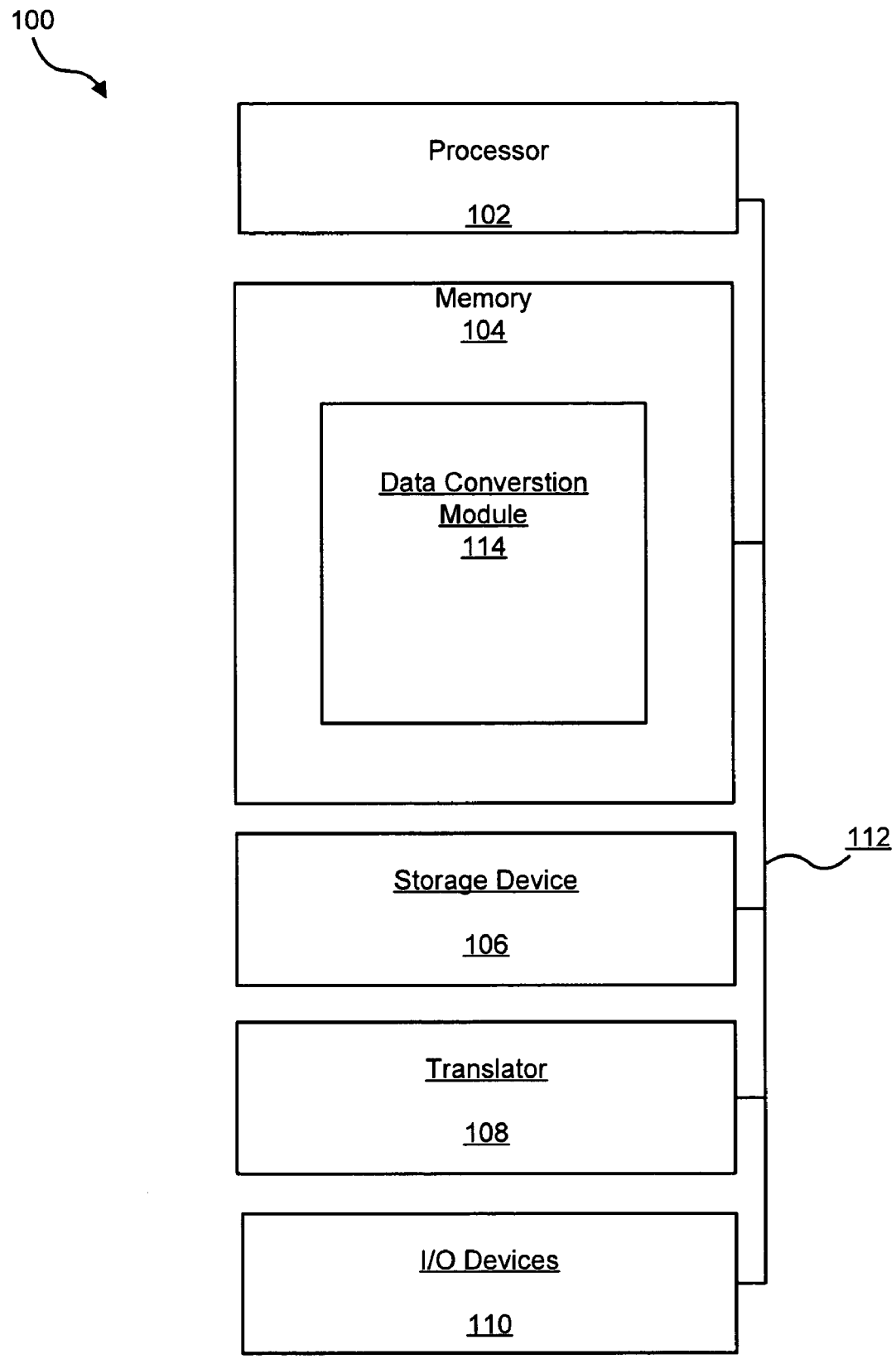
FIG. 1 is a schematic block diagram illustrating one embodiment of a system for converting data in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 depicts a system 100 to convert data. The system 100 includes a processor 102, a memory 104, a storage device 106, a translator 108, and input/output (I/O) devices 110. Those of skill in the art recognize that the system 100 may be simpler or more complex than illustrated, so long as the system 100 includes modules or sub-systems that correspond to those described herein. In one embodiment, the system 100 comprises hardware and/or software more commonly referred to as a Multiple Virtual Storage (MVS), OS/390, zSeries/Operating System (z/OS), UNIX, Linux, or Windows system 100.

Typically, the processor 102 comprises one or more central processing units executing software and/or firmware to control and manage the other components within the system 100. The storage device 106 provides persistent storage of data. In particular, the storage device 106 stores one or more data files (not shown) that include one or more data lines. In one embodiment, the data file is not entirely made up of source code.

The memory 102 may be any memory within the system that can store data files or modules for converting data files, including but not limited to, RAM, ROM, PROM, EPROM, Flash PROM, storage arrays, hard drives and the like. The memory 102 may include a data conversion module 114 for receiving and converting a data file.

The translator 108 in one embodiment is a compiler capable of compiling a data file into object code or some other machine language. In another embodiment, the translator 108 is an assembler capable of assembling a data file into assembly language or other machine language. It will be appreciated by those of skill in the art that the translator may include other types of hardware, firmware, or software capable of translating a data file into a set of computer language instructions or machine-readable code. Additionally, the translator 108, storage device 106, and I/O devices 110 may reside in the memory 104.

The I/O devices 110 permit a user to interface with the system 100. In one embodiment, the user provides a data file for conversion. Alternatively, data files may be stored in a script, software code, or the like, and may be accessed automatically by the system 100. The I/O devices 106 include standard devices such as a keyboard, monitor, mouse, and the like. I/O devices 106 are coupled to a communication bus 112 via one or more I/O controllers that manage data flow between the components of the system 100 and the I/O devices 106.

The communication bus 112 operatively couples the processor 102, memory 104, storage device 106, translator 108, and I/O devices 110. The communication bus 112 may implement a variety of communication protocols including Peripheral Communication Interface, Small Computer System Interface, and the like.

Figure 2:
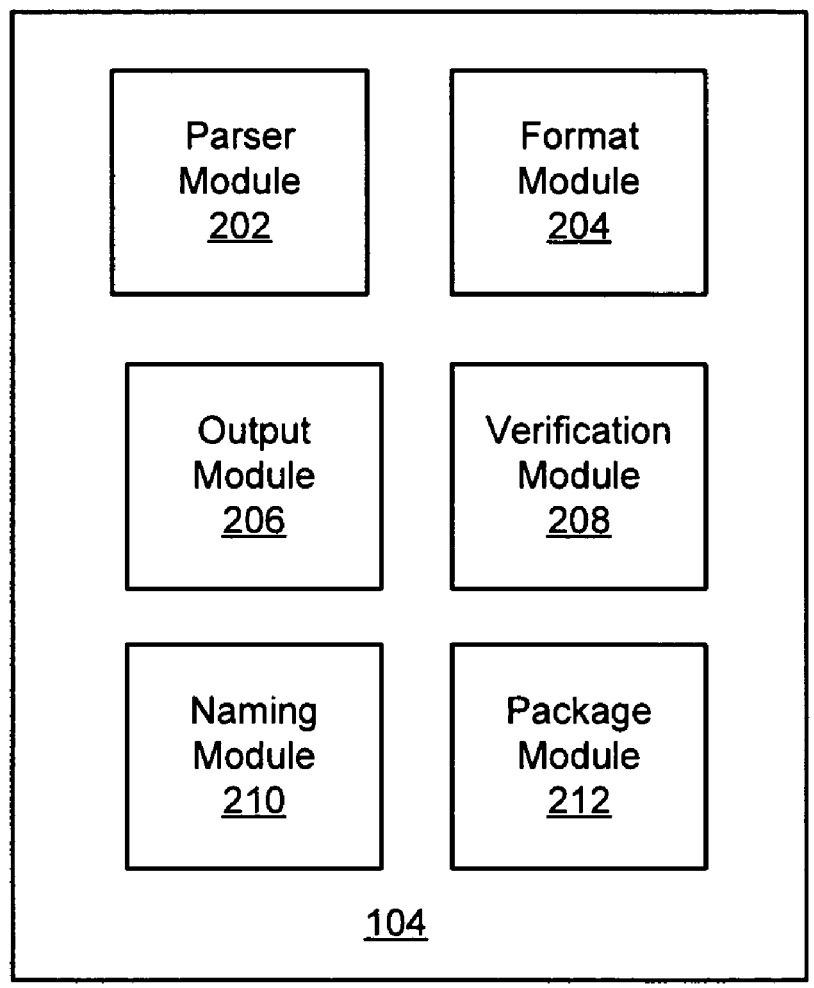
FIG. 2 is a schematic block diagram illustrating one embodiment of an apparatus for converting data suitable for use in the system of FIG. 1.

Referring now to FIG. 2, the memory 104 may include a parser module 202, a format module 204, and output module 206, a verification module 208, a naming module 210, and a package module 212. These modules collectively may be part of the data conversion module 114 and may make up a data conversion apparatus that may be used as part of the system 100 or as a separate unit. Additionally, the executables that make up each module may reside in the same memory 104 or in different memory locations within, or outside, system 100.

The parser module 202 is configured to receive and analyze a data file having one or more data lines. In one embodiment, the parser module 202 analyzes the data file character by character. In another embodiment, the parser module 202 analyzes the data file line by line. The parser module 202 may be configured to work in conjunction with the translator 108 to identify characters, symbols, identifiers, spaces, hidden characters and the like, in the data file that do not comply with a particular syntax associated with the translator. The parser module 202 is in communication with the format module 204, such that the analysis of the data file, conducted by the parser module 202, is used by the format module 108 to convert the data file into a format containing one or more computer language instructions. It will be appreciated by those skilled in the art that the parser module 202 may be configured in a variety of ways to systematically analyze the data in the data file according to the teachings of the present invention. Furthermore, parsing the data and formatting the data may occur sequentially or simultaneously.

The format module 204 is configured to automatically format the data file such that the formatted data file can be translated by the translator 108. In one embodiment, the formatted data file includes one or more computer language instructions. It will be appreciated by those of skill in the art that computer language instructions may include, without limitation, machine language, assembly language, object code, declare statements, and the like.

In one embodiment, the format module 204 removes trailing blanks from each data line in the data file. Trailing blanks may include return characters, page break characters, line break characters, spaces, and the like. The format module 204 is also configured to modify the data file to allow processing of special symbols having syntax meaning to the translator. The format module 204 may insert one or more tokens into the data file to satisfy the syntax requirements of the translator 108.

For example, in an embodiment where the translator 108 is an assembler, the format module 204 would convert the data file into a file that could be assembled by the assembler. However, the ampersand ("&") and the single quote mark ("'") have syntax meaning in assembly language. In order to treat the ampersands and single quote marks in the data file as regular characters (not having special syntax meaning), the format module adds an ampersand adjacent to the ampersand in the data file and a single quote mark adjacent to the single quote mark in the data file. By assembly language convention, the translator 108 knows to treat the double ampersand or double single quote mark as a single data character respectively and not as a character with syntax meaning.

As discussed above, in one embodiment, the token is a character such as an ampersand or single quote mark. In another embodiment, the token may be a return symbol or other identifier or symbol. The token may also be a string of characters, symbols, identifiers and the like. For example, the particular syntax conventions of the translator 108 may require the addition of a header or footer on each page of data or on each line of data. The inserted token may be string of identifiers or a multiple strings of identifiers that satisfy the syntax requirements of a particular translator 108.

In one embodiment, the format module 204 compares a length of each data line to a predetermined data line length threshold. If the data line exceeds the threshold, that data line is split so that the length of the first portion is less than or equal to the data line length threshold. If the remaining portion of the split data line is still larger than the threshold the remaining portion is split again until no portion of the original line is longer than the threshold. The format module may place a continuation code in each portion of the split data line. In one embodiment, the continuation code is placed at the end of a split data line in accordance with assembly language syntax.

It will be appreciated by those of skill in the art that some translators 108 require data lines of certain lengths in order to convert that data file into machine readable form. It will further be appreciated that there are a variety of ways to split a data line and still practice the teachings of this invention. For example, the threshold could be such that the split occurs once the threshold is exceeded. The threshold could also be set such that the split occurs once the threshold is equaled. It will further be appreciated by those of skill in the art that the format module 204 can be configured in a variety of ways to facilitate the conversion of a data file into a file that includes at least one computer language instruction.

The output module 206 is configured to output the formatted data file as an output file for translation by the translator. In one embodiment, the output file is source code that can be compiled into object code. In another embodiment, the output file is code that can be compiled or assemble into machine language. The output file contains one or more computer language instructions.

The verification module 112 may be configured to verify the formatting of the data file by the format module 204. In one embodiment, the verification module 112 allows for manual verification of the formatted data file. The verification module may send the formatted file to an output device such as a printer, monitor, or the like, for viewing by a user. In another embodiment, the verification module 112 automatically verifies the formatting of the formatted data file. For example, the verification module 208 may attempt to translate the formatted file and send any syntax errors to an output device for viewing. In the embodiment, for example, where the translator 108 is an assembler, the verification module 208 may assemble the formatted data file and note any syntax errors. In another embodiment, if there are syntax errors, the verification module 208 sends an error message to a user by means of the I/O devices 110. In yet another embodiment, the verification module 208 identifies the particular syntax errors in the formatted data file. The verification module 208, in the instance of an error, may send the data file back to the format module 204 for further formatting.

The naming module 210 is configured to create a name for the output file. In one embodiment, the naming module 210 adds a suffix to at least a portion of a data file name to create an output file name. In another embodiment, the naming module 210 adds a suffix to the entire original data file name. It will be appreciated by those of skill in the art that saving the modified data file under a name different from the original data file name will preserve the original data file.

The package module 212 is configured to package the translated output file as a load module. Typically, the package module 212 is unable to package a file as a load module unless the file contains computer language instructions such as assembly language instruction. Preferably, the translated output file comprises computer language instructions. A load module may be defined as containing executable code, computer instructions, libraries and the like. A load module also includes searchable data that conforms to the particular naming conventions or other conventions of the system on which it resides, allowing for rapid access to the data. The package module 212 may couple the translated data file with other files or libraries that will allow the data in the data file to be accessed by load module search techniques known in the industry.

Figure 3A:
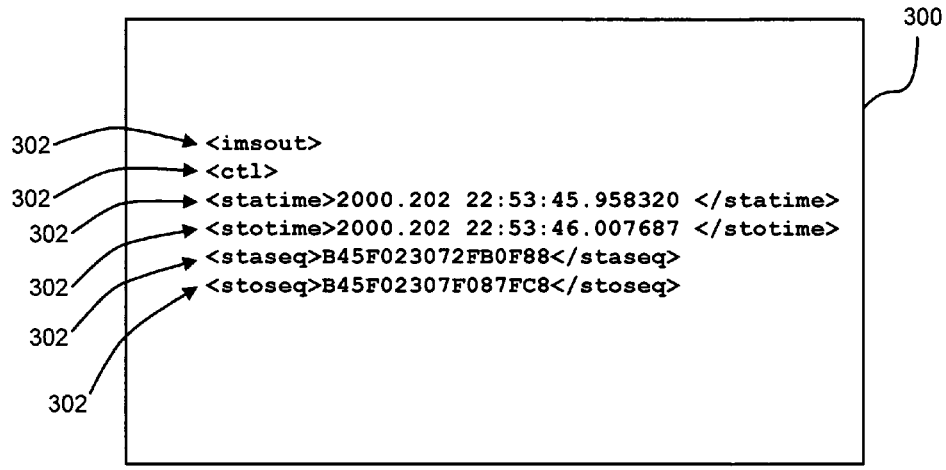
FIG. 3A is a typed drawing of one embodiment of a data file in accordance with the present invention.
Figure 3B:
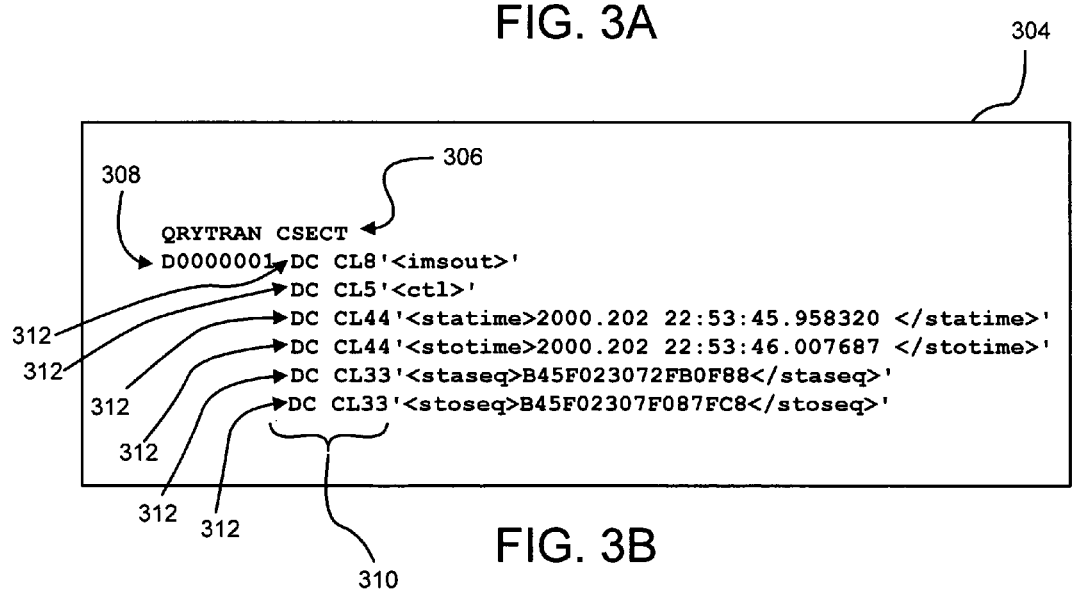
FIG. 3B is a typed drawing illustrating one embodiment of the data file of FIG. 3A formatted in accordance with the present invention.

Turning now to FIG. 3A, a portion of one embodiment of a data file 300 according to the present invention is shown. The data file 300 includes a plurality of data lines 302. FIG. 3B illustrates the data file 300 of FIG. 3A modified according to the teachings of the present invention. The data file 304 in FIG. 3B is modified such that it can be assembled by an assembler. The modified data file 304 includes a file header 306 and a line header 308, both of which are necessary for assembling according to certain assembly language convention. Each data line 302 is modified to include a string of characters 310 which convert each data line 302 of the data file 300 into declare statements 312 according to assembly language convention. It will be appreciated by those of skill in the art that if a different translator 108 is used, the data file 300, and perhaps each data line 302, would be converted according to the conventions and constructs of the particular translator 108 being used to convert the data file.

Figure 4A:
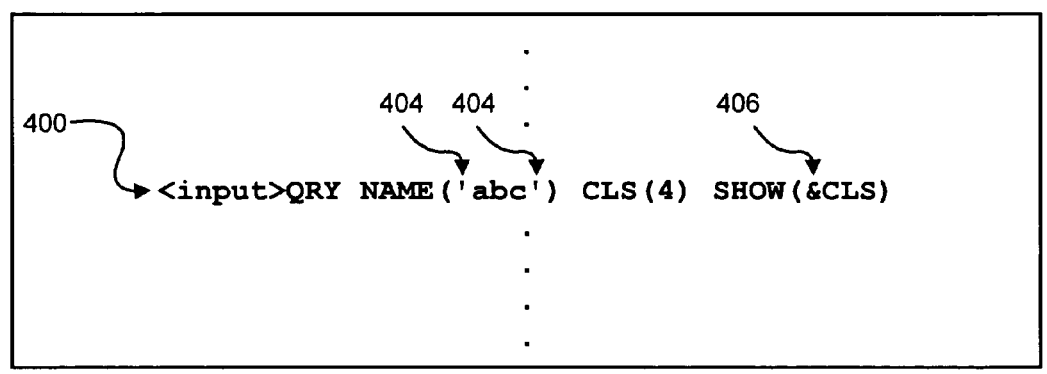
FIG. 4A is a typed drawing illustrating one embodiment of a data line in accordance with the present invention.
Figure 4B:
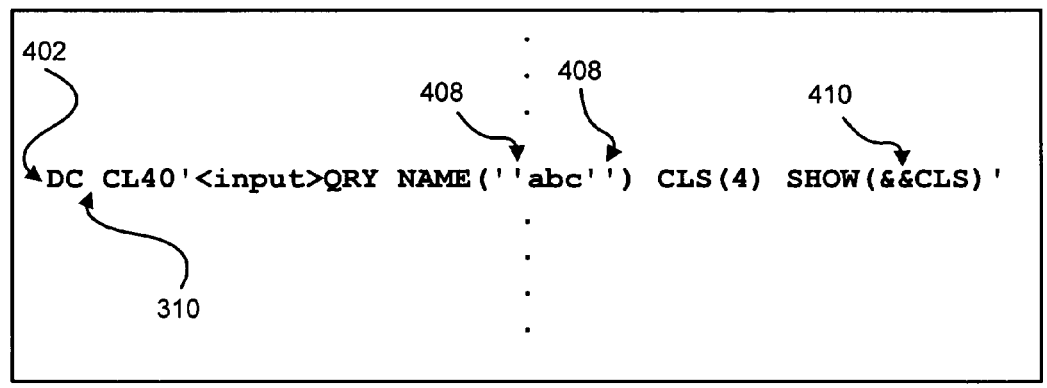
FIG. 4B is a typed drawing illustrating one embodiment of the data line of FIG. 4A formatted in accordance with the present invention.

Turning now to FIGS. 4A and 4B, one embodiment of a data line 400 is shown according to the teachings of the present invention. FIG. 4A illustrates a data line 400 before it is modified. FIG. 4B illustrates a modified data line 402. The original data line 400 includes a plurality of single quote marks 404 and an ampersand 406. It will be appreciated by those of skill in the art that in some assembly language constructs, the single quote mark and the ampersand have special syntax meaning. When an assembler encounters either of these two special characters, the assembler treats them as instructions to perform some act. In order for these two characters to be treated as simple characters and not "triggering" characters, assembly language convention requires that an additional single quote mark be inserted adjacent the original single quote mark. Likewise, an additional ampersand is placed adjacent to an ampersand in the original data line to turn off the trigger effect of an ampersand encountered by the assembler.

FIG. 4B illustrates a modified data line 402 that includes an inserted consecutive single quote mark 408 and a consecutive ampersand 410. The modified data line 402 also includes a line header 310. It will be appreciated by those of skill in the art that a variety of tokens such as characters and strings can be used when converting the data line 400 into something that can be translated 402.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 5:
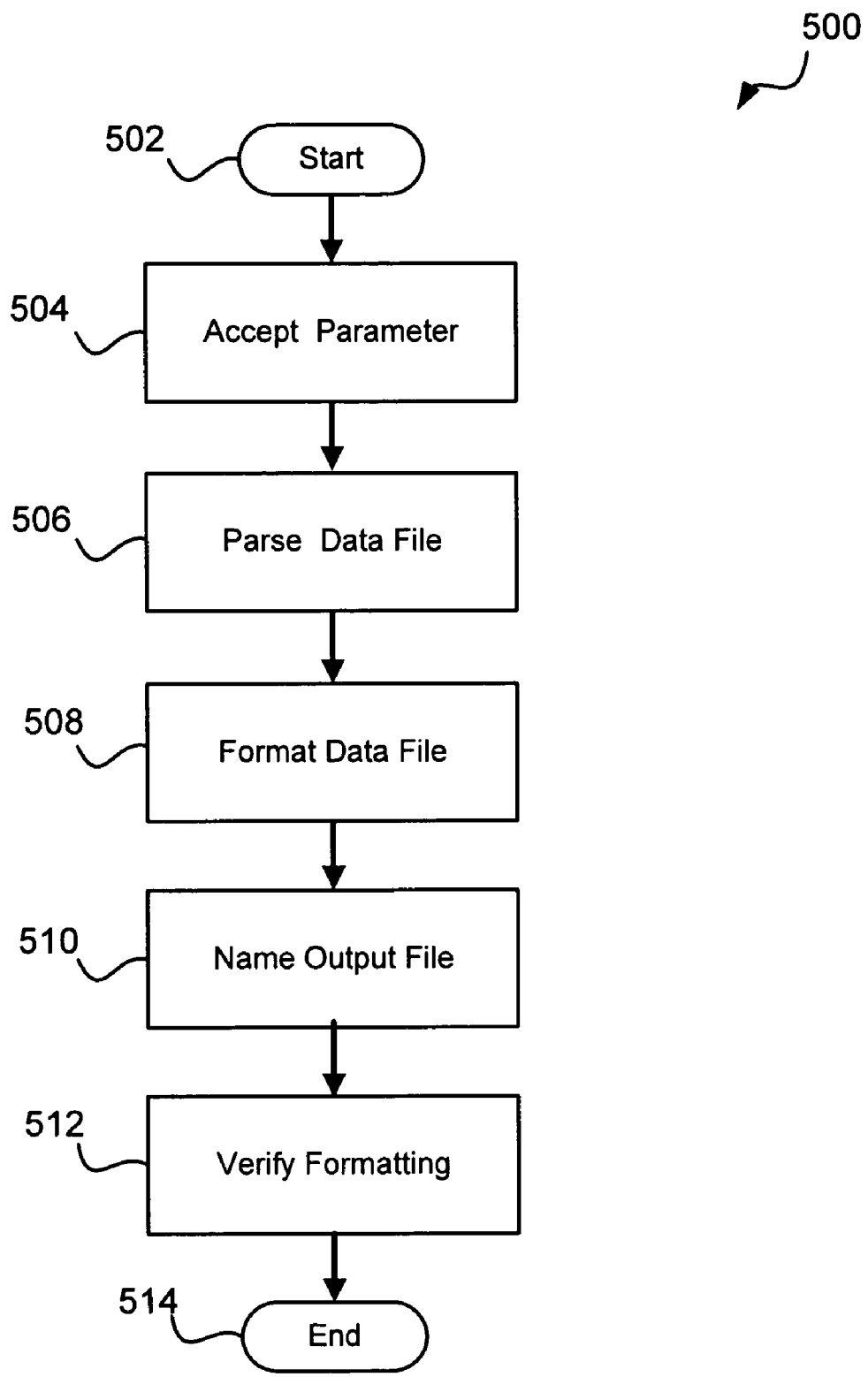
FIG. 5 is a schematic flow chart diagram illustrating one embodiment of a data converting method in accordance with the present invention.

FIG. 5 is flow chart diagram illustrating one embodiment of a method 500 for converting data in accordance with the present invention. In one embodiment, the method 500 can be implemented in a conventional system by modifying computer readable code in order to implement the data conversion module or apparatus 114 described above. In another embodiment, a signal bearing medium tangibly embodies a program of machine-readable instructions executable by a digital processing apparatus to perform an operation to convert data.

The method 500 or operation may start 502 by accepting 504 a parameter. The parameter may be a file name or other identifier indicating the location of a data file having one or more data lines. The operation then parses 506 the data file.

Simultaneous with, or after the parsing 506 of the data file, the data file is formatted 508 such that the formatted data file can be translated by a translator. In one embodiment, the formatted data file includes one or more computer language instructions. The instructions may be in a variety of computer languages, including, without limitation, COBOL, FORTRAN, basic, assembly, C, C++, machine language, declaration statements, and the like.

In one embodiment, the method 500 then creates 510 an output file name for the formatted data file. It will be appreciated by those of skill in the art that creating 510 a name for the modified data file can occur at any time after the start of the method or operation.

The method or operation also includes verifying 512 that the original data file was formatted 508 properly, such that the data file can be translated by the translator. In one embodiment, verifying 512 includes translating the modified data file and noting any syntax errors in the process. In another embodiment, verifying 512 includes presenting the modified data file to a user by means of an output device such as a monitor or printer.

Figure 6:
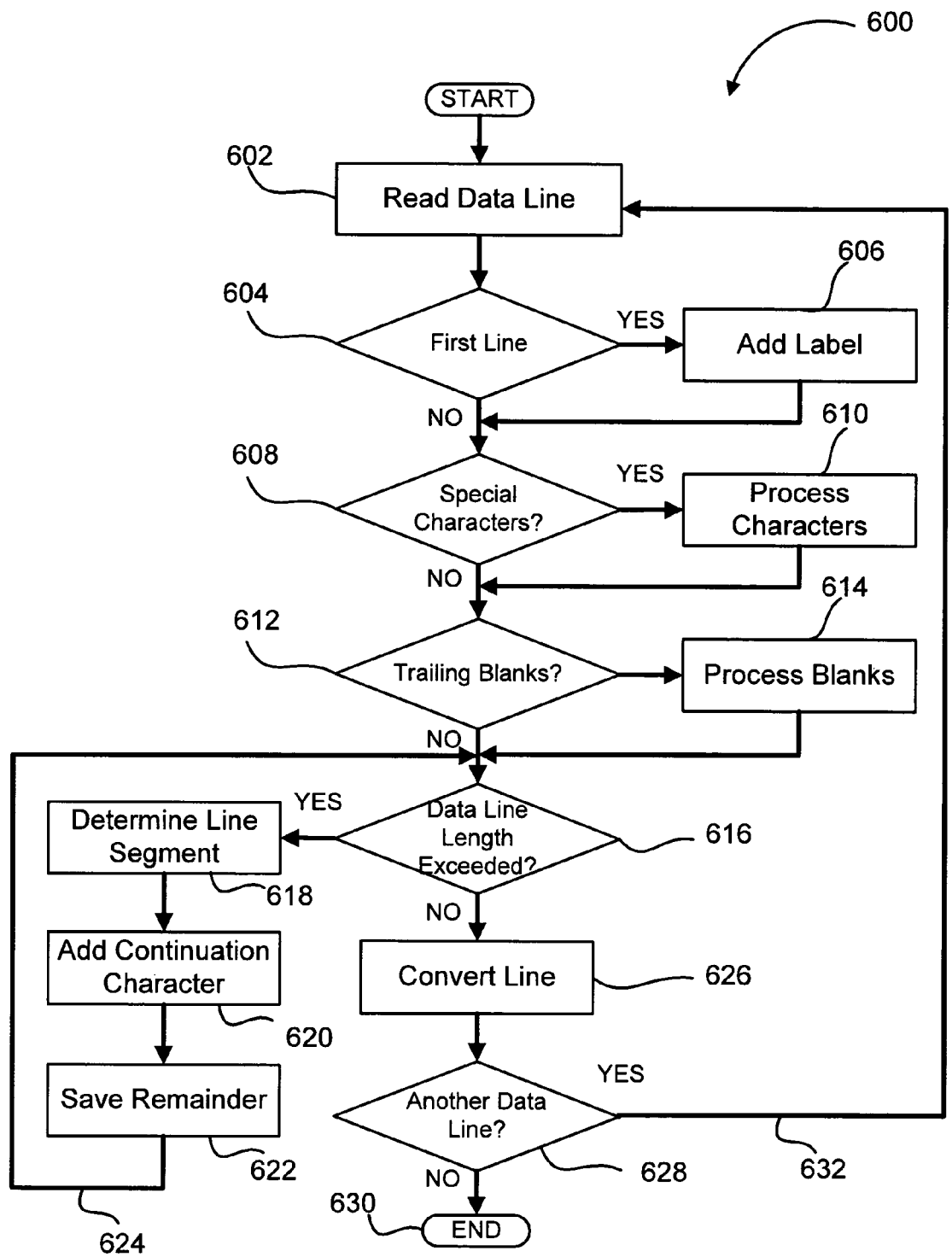
FIG. 6 is a schematic flow chart diagram illustrating one embodiment of a data converting method in accordance with the present invention.

FIG. 6 illustrates a flow chart 600 for formatting a data file according to one embodiment of the present invention. After a data file is accepted, the system 100 or apparatus 114 (hereinafter collectively "data converter") reads 602 a data line. The data converter then determines 604 if the data line is a "first line" of the data file. If it is, the data converter adds a label to the start of the data line.

The data converter then determines 608 whether there are any special characters in the data line that have special meaning to the translator. If there are, the data converter processes 610 the special characters. For example, if there are characters such as the ampersand, that have special meaning in assembly language, they are dealt with according to the conventions of the translator being used. Where the translator is an assembler, an additional ampersand would be placed adjacent the first ampersand to disable any triggering event caused by the ampersand, and to treat the ampersand as a regular character.

The data converter then determines 612 whether there are any trailing blanks. If there are, the blanks are removed 614. The data converter then determines 616 whether the length of the data line exceeds a predetermined threshold. If it does, the data converter determines 618 the proper length for the data line, splits the data line to that length, and adds 620 a continuation character at the appropriate place. The remainder of the data line is saved 622 and the line length process is repeated 624 until the remainder portion of the split data line is less than the length threshold.

After the special characters, trailing blanks, and data line lengths are processed, the data converter converts 626 the data line. The data converter then determines 628 if there is another data line to be processed. If there is not, the process ends 630. If there is, the process is repeated 632.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus implemented with a processor and a memory, the apparatus to convert data, the apparatus comprising:
    a parser module configured to parse a data file having one or more data lines;
    a format module configured to automatically format the data file such that the formatted data file can be translated by a translator, the formatted data file comprising one or more computer language instructions;
    the translator configured to translate the formatted data file, the translator translating the formatted data file into one of object code, assembly language, and machine language;
    an output module configured to output the formatted data file as an output file; and
    a package module configured to package the translated output file as a searchable mainframe load module, the searchable load module compatible with a load library operating on a legacy computer system executing a mainframe operating system, the load library configured to return a file without a complete path name in response to a load command.

2. The apparatus of claim 1, further comprising a verification module configured to verify the formatting of the data file.

3. The apparatus of claim 1, wherein the data file is not entirely made up of source code.

4. The apparatus of claim 1, wherein the translator comprises an assembler for translating the formatted data file into assembly language.

5. The apparatus of claim 1, wherein the translator comprises a compiler for translating the formatted data file into object code.

6. The apparatus of claim 1, wherein the format module formats the data file such that the formatted data file can be translated into machine language.

7. The apparatus of claim 1, wherein the format module removes trailing blanks from one or more data lines in the data file.

8. The apparatus of claim 1, wherein the format module modifies the data file to allow processing of special symbols having syntax meaning to the translator.

9. The apparatus of claim 1, wherein the format module inserts at least one token configured to satisfy syntax requirements of the translator.

10. The apparatus of claim 1, wherein the format module is configured to compare a length of each data line to a predefined data line length threshold.

11. The apparatus of claim 10, wherein the format module splits each data line exceeding the data line length threshold into a portion of an original data line having a length less than or equal to the data line length threshold.

12. The apparatus of claim 11, wherein the format module places a continuation code in each split data line.

13. The apparatus of claim 1, further comprising naming module configured to create a name for the output file.

14. The apparatus of claim 13, wherein the naming module adds a suffix to at least a portion of a data file name to create an output file name.

15. A computer implemented method to convert data, the method comprising:
- parsing an Extensible Markup Language (XML) data file having one or more data lines;
- formatting the XML data file such that the formatted XML data file can be translated by a translator, the formatted XML data file comprising one or more computer language instructions;
- translating the formatted XML data file with the translator, the translator translating the formatted XML data file into one of object code, assembly language, and machine language;
- outputting the formatted XML data file as an output file; and
- packaging the translated output file as a searchable mainframe load module, the searchable mainframe load module compatible with a load library operating on a legacy computer system executing a mainframe operating system, the searchable mainframe load module comprising executable code, computer instructions, and searchable data conforming to naming conventions of the legacy computer system, the load library configured to return a file without a complete path name in response to a load command.

16. The computer implemented method of claim 15, further comprising verifying that the formatted XML data file can be translated by the translator.

17. The computer implemented method of claim 15, further comprising comparing a length of each data line to a predetermined data line length threshold and splitting data lines that exceed the data line length threshold.

18. The computer implemented method of claim 15, wherein the XML data file is not entirely source code.

19. The computer implemented method of claim 15, wherein formatting the XML data file comprises removing trailing blanks from one or more data lines in the XML data file.

20. The computer implemented method of claim 15, wherein the translator comprises an assembler for translating the formatted XML data file into assembly language.

21. The computer implemented method of claim 15, wherein formatting the XML data file comprises inserting at least one token configured to satisfy syntax requirements of the translator.

22. A computer-readable storage medium tangibly embodying a program of machine-readable instructions executable by a digital processing apparatus to perform an operation to convert data, the operation comprising:
- parsing a data file having one or more data lines;
- formatting the data file such that the formatted data file can be translated by a translator, the formatted data file comprising one or more computer language instructions;
- translating the formatted data file with a translator, the translator translating the formatted data file into one of object code, assembly language, and machine language;
- outputting the formatted data file as an output file; and
- packaging the translated output file as a searchable mainframe load module, the searchable mainframe load module compatible with a load library operating on a legacy computer system executing a mainframe operating system, the load library configured to return a file without a complete path name in response to a load command.

23. The computer-readable storage medium of claim 22, further comprising verifying that the formatted data file can be translated by the translator.

24. The computer-readable storage medium of claim 22, further comprising comparing a length of each data line to a predetermined data line length threshold and splitting data lines that exceed the data line length threshold.

25. The computer-readable storage medium of claim 22, wherein the data file is not entirely source code.

26. The computer-readable storage medium of claim 22, wherein formatting the data file comprises removing trailing blanks from one or more data lines in the data file.

27. The computer-readable storage medium of claim 22, wherein the translator comprises an assembler for translating the formatted data file into assembly language.

28. The computer-readable storage medium of claim 22, wherein formatting the data files comprises inserting at least one token configured to satisfy syntax requirements of the translator.

* * * * *